(12) United States Patent
Martin et al.

(10) Patent No.: US 12,429,048 B2
(45) Date of Patent: Sep. 30, 2025

(54) PACKING CASE WITH DEGRADATION MONITORING

(71) Applicant: Dover Pumps & Process Solutions Segment, Inc., Downers Grove, IL (US)

(72) Inventors: Jason Craig Martin, Louisville, KY (US); Vitali Kvachnev, Pearland, TX (US)

(73) Assignee: Dover Pumps & Process Solutions Segment, Inc., Downers Grove, IL (US)

( * ) Notice: Subject to any disclaimer, the term of this patent is extended or adjusted under 35 U.S.C. 154(b) by 0 days.

(21) Appl. No.: 18/491,677

(22) Filed: Oct. 20, 2023

(65) Prior Publication Data

US 2024/0133374 A1 Apr. 25, 2024
US 2024/0229788 A9 Jul. 11, 2024

Related U.S. Application Data

(60) Provisional application No. 63/422,233, filed on Nov. 3, 2022, provisional application No. 63/417,931, filed on Oct. 20, 2022.

(51) Int. Cl.
*F04B 53/14* (2006.01)
*F04B 35/04* (2006.01)
(Continued)

(52) U.S. Cl.
CPC .......... *F04B 53/143* (2013.01); *F04B 35/045* (2013.01); *F04B 39/0022* (2013.01);
(Continued)

(58) Field of Classification Search
CPC ........ F16J 15/26; F16J 15/006; F16J 15/3296; F04B 53/143
See application file for complete search history.

(56) References Cited

U.S. PATENT DOCUMENTS 4,691,276 A * 9/1987 Miller .................. F16J 15/3492
277/377
7,120,523 B2 10/2006 Muller
(Continued)

FOREIGN PATENT DOCUMENTS

DE 102014225872 6/2016
EP 0220531 5/1987
(Continued)

OTHER PUBLICATIONS

International Search Report and Written Opinion in International Appln. No. PCT/US2023/035634, mailed on Feb. 2, 2024, 17 pages.

*Primary Examiner* — Abiy Teka
(74) *Attorney, Agent, or Firm* — Fish & Richardson P.C.

(57) ABSTRACT

A method of monitoring degradation of seals of a packing case includes receiving signals from a first temperature sensor installed in a first location in a housing of the packing case; receiving signals from a second temperature sensor installed in a second location in the housing of the packing case; computing, from the signals, a temperature differential between the first temperature sensor and the second temperature sensor at two or more times; and determining, at least in part from the temperature differential at the two or more times, a degradation indicator for at least one of the seals of the packing case.

37 Claims, 14 Drawing Sheets

(51) Int. Cl.
*F04B 39/00* (2006.01)
*F04B 49/10* (2006.01)

(52) U.S. Cl.
CPC ...... *F04B 49/10* (2013.01); *F04B 2201/0205* (2013.01); *F04B 2201/0801* (2013.01)

(56) References Cited

U.S. PATENT DOCUMENTS

| | | |
|---|---|---|
| 10,467,881 B2 | 11/2019 | Chen et al. |
| 2002/0051593 A1 | 5/2002 | Oka |
| 2012/0267858 A1* | 10/2012 | Rust ..................... F16J 15/3296 277/321 |
| 2019/0257327 A1* | 8/2019 | Chen ....................... E02F 9/267 |
| 2021/0262481 A1* | 8/2021 | Kasatani ............. G01M 3/2853 |
| 2022/0243746 A1 | 8/2022 | Smith et al. |
| 2022/0325800 A1* | 10/2022 | Feistel ................... F16J 15/004 |

FOREIGN PATENT DOCUMENTS

| | | |
|---|---|---|
| EP | 3786495 | 3/2021 |
| NL | 1001265 | 1/1996 |

\* cited by examiner

PACKING CASE WITH DEGRADATION MONITORING

CROSS-REFERENCE TO RELATED APPLICATIONS

This application claims priority under 35 U.S.C. § 119 to U.S. Application Ser. No. 63/417,931, filed on Oct. 20, 2022, and U.S. Application Ser. No. 63/422,233, filed on Nov. 3, 2022, the contents of each of which are hereby incorporated by reference.

TECHNICAL FIELD

This invention relates to sealing shafts of high-pressure gas processing equipment such as reciprocating compressors, particularly with progressive sealing systems.

BACKGROUND

Progressive or multistage sealing systems are commonly employed when high differential pressures are to be maintained, such as between atmosphere and a high pressure cavity into which a moving shaft extends. Effective, reliable sealing often requires a sealing system in which pressure is reduced along the shaft in stages, or progressively along a labyrinth. The compression industry strives to increase maximum allowable working pressure and system speed as required by heightened customer specifications. However, increasing differential pressure typically makes it more difficult to contain gas within the system and can also apply more stress on associated sealing elements, thereby increasing pressure pulsation within the system, consumption of lubrication oil, and undesired emission of gas to the atmosphere. The pressures encountered in operation result in wear on the seals and reduced reliability.

Packing cases for reciprocating compressors operate with a series of rod rings in individual housings. The compressor stroke of a reciprocating compressor is a dynamic event that occurs in a very short timeframe (e.g., 20 times per second for a 1200 RPM compressor).

The useful life of seal components of a progressive sealing system such as a packing case vary depending on load conditions, seal material properties, environmental conditions, and other factors. The risk of seal failure can, in part, be addressed by periodic maintenance to replace seals before they fail. Nevertheless, uncertainty in the actual performance of a given seal system in operation may result in maintenance occurring too early, or, worse, too late in a particular system.

SUMMARY

Implementations described herein may have particular utility in the context of packing cases for gas processing systems such as reciprocating compressors.

In one aspect of the disclosure, a method of monitoring degradation of seals of a packing case includes: receiving signals from a first temperature sensor installed in a first location in a housing of the packing case; receiving signals from a second temperature sensor installed in a second location in the housing of the packing case; computing, from the signals, a temperature differential between the first temperature sensor and the second temperature sensor at two or more times; and determining, at least in part from the temperature differential at the two or more times, a degradation indicator for at least one of the seals of the packing case.

In some implementations, the packing case defines a cylinder-side and a driver-side, the first location is on the cylinder-side of one of the seals of the packing case, and the second location is on the driver-side of the one of the seals of the packing case.

In some implementations, the first temperature sensor and the second temperature sensor are axially spaced from one another along a length of the packing case.

In some implementations, at least one of the temperature sensors is embedded in a bore in the housing of the packing case.

In some implementations, the degradation indicator is based at least in part on an increase in differential temperature between the first temperature sensor and the second temperature sensor over time.

In some implementations, the degradation indicator is based at least in part on one or more changes in differential temperature between the first temperature sensor and the second temperature sensor over time.

In some implementations, the degradation indicator is based at least in part on a maximum differential temperature between the first temperature sensor and the second temperature sensor.

In some implementations, the degradation indicator is based at least in part on an increase in differential temperature in the first temperature sensor over time.

In some implementations, at least one of the degradation indicators is based at least in part on a deduced leakage flow rate.

In some implementations, the method includes sensing a pressure in the packing case, determining, from at least one sensed pressure, a degradation indicator for at least one of the seals of the packing case.

In some implementations, the pressure is sensed on a cylinder-side of at least one of the temperature sensors.

In some implementations, the pressure is sensed on a driver-side of at least one of the temperature sensors.

In some implementations, the pressure is sensed in a lube line of the packing case.

In some implementations, the pressure is sensed in a vent line of the packing case.

In some implementations, the method includes providing a notification to a user based on the degradation indicator.

In another aspect of the disclosure, a monitoring system for a packing case includes a first temperature sensor, a second temperature sensor, and a computing device. The packing case has two or more seals and defines a cylinder-side and a driver-side. The first temperature sensor is coupled to a housing of the packing case and configured to sense a temperature on the cylinder-side of one of the seals. The second temperature sensor is coupled to the housing and configured to sense a temperature on the driver-side of the one of the seals. The computing device is communicatively coupled to the first temperature sensor and the second temperature sensor, the computing device configured to: receive signals from the first temperature sensor and the second temperature sensor; compute, from the signals, a temperature differential between the first temperature sensor and the second temperature sensor at two or more times; and determine, at least in part from the temperature differential at the two or more times, a degradation indicator for at least one of the seals of the packing case.

In some implementations, the two or more seals include a pressure breaker, a first seal, a second seal, and a third seal.

The first seal is axially disposed on the driver-side of the pressure breaker. The second seal is axially disposed on the driver-side of the first seal. The third seal axially disposed on the driver-side of the second seal. The one of the seals is the third seal. The first temperature sensor is axially disposed between the second seal and the third seal.

In some implementations, the second temperature sensor is axially disposed between the third seal and an end plate seal.

In some implementations, the two or more seals include a second seal axially disposed on the cylinder-side of the one of the seals. The system further includes a third temperature sensor axially disposed on the cylinder-side of the second seal. The computing device is communicatively coupled to the third temperature sensor. The computing device is configured to compute a temperature differential between the third temperature sensor and at least one of the first temperature sensor and the second temperature sensor.

In some implementations, the monitoring system includes a pressure sensor configured to sense a pressure on the cylinder-side of the one of the seals.

In some implementations, the monitoring system includes a pressure sensor coupled to a lube line of the packing case.

In some implementations, the monitoring system includes a pressure sensor configured to sense a pressure on the driver-side of the one of the seals.

In some implementations, the monitoring system includes a pressure sensor coupled to a vent line of the packing case.

In some implementations, the packing case monitoring system is communicatively coupled to a cylinder-side pressure sensor, wherein the packing case monitoring system is configured to determine, from information received from the cylinder-side pressure sensor, a degradation indicator.

In some implementations, the packing case monitoring system is communicatively coupled to a driver-side pressure sensor, wherein the packing case monitoring system is configured to determine, from information received from the driver-side pressure sensor, a degradation indicator.

In some implementations, the packing case monitoring system is configured to provide a notification of the degradation indicator to a user.

In some implementations, the packing case monitoring system is configured to provide a notification to a user about degradation of one or more of the seals.

In some implementations, the packing case monitoring system is configured to provide, based at least in part on the degradation indicator, a notification to a user about timing of a maintenance event for one or more of the seals of the packing case.

In some implementations, the packing case monitoring system is configured to provide, based at least in part on the degradation indicator, a warning to a user about a seal failure in the packing case.

In some implementations, the packing case monitoring system is configured to provide, based at least in part on the degradation indicator, a predictor to a user about one or more of the seals of the packing case.

In another aspect of the disclosure, a packing case assembly includes a plurality of seals, a housing, an end plate, a first temperature sensor, and a second temperature sensor. The housing is configured to hold at least two of the seals. The end plate is coupled to the housing. The first temperature sensor is coupled to a housing of the packing case and configured to sense a temperature on the cylinder-side of one of the seals. The second temperature sensor is coupled to the housing and configured to sense a temperature on the driver-side of the one of the seals.

In another aspect of the disclosure, a reciprocating compressor system includes a compression cylinder, a driver, a rod, a packing case through which the rod passes, and a packing case monitoring system. The compression cylinder defines a compression chamber. The rod is coupled between the driver and the compression cylinder. The driver operable to reciprocate the rod such that gas is compressed in the compression chamber. The packing case is between the compression cylinder and the driver. The packing case defines a cylinder-side and a driver-side. The packing case includes a plurality of seals through which the rod passes, a housing configured to hold at least two of the seals, and an end plate coupled to the housing. The packing case monitoring system includes a packing case monitoring system includes a first temperature sensor, a second temperature sensor, and a computing device. The first temperature sensor is coupled to a housing of the packing case and configured to sense a temperature on the cylinder-side of one of the seals. The second temperature sensor is coupled to the housing and configured to sense a temperature on the driver-side of the one of the seals. The computing device is communicatively coupled to the first temperature sensor and the second temperature sensor. The computing device is configured to: receive signals from the first temperature sensor and the second temperature sensor; compute, from the signals, a temperature differential between the first temperature sensor and the second temperature sensor at two or more times; and determine, at least in part from the temperature differential at the two or more times, a degradation indicator for at least one of the seals of the packing case.

In another aspect of the disclosure, a method of monitoring degradation of seals of a packing case includes: receiving signals from one or more temperature sensors installed in a housing of the packing case; receiving signals from one or more pressure sensors coupled to the housing of the packing case; computing, from the signals, a temperature at two or more times and a pressure at two or more times; and determining, from at least one of the temperatures and at least one of the pressures, one or more degradation indicators for at least one of the seals of the packing case.

In some implementations, at least one of the degradation indicators is determined from two or more temperatures.

In some implementations, at least one of the degradation indicators is determined from two or more pressures.

In some implementations, at least one of the degradation indicators is determined from a deduced leakage flow rate.

In some implementations, at least one of the degradation indicators is an early-stage degradation indicator.

In some implementations, at least one of the degradation indicators is a mid-stage degradation indicator.

In some implementations, at least one of the degradation indicators is a late-stage degradation indicator.

In another aspect of the disclosure, a monitoring system for a packing case includes one or more temperature sensors, one or more pressure sensors, and one or more computing devices. The one or more temperature sensors coupled to the housing and configured to sense temperature in at least one location in the packing case. The one or more pressure sensors fluidly coupled to one or more spaces in the packing case and configured to sense pressure in at least one location in the packing case. The computing device is communicatively coupled to at least one of the one or more temperature sensors and at least one of the one or more pressure sensors. The computing device is configured to receive signals from the at least one temperature sensor and the at least one pressure sensor; and compute, from signals from at least one of the temperature sensors and the at least one of the pressure sensors, a degradation indicator for at least one of the seals of the packing case.

In some implementations, the one or more temperature sensors include two or more temperature sensors, wherein the computing device is configured to compute, based on signals from the temperature sensors, a temperature differential at two or more times.

In some implementations, at least one of the pressure sensors is coupled to a vent line of the packing case.

In some implementations, at least one of the pressure sensors is coupled to a lube line of the packing case.

In another aspect of the disclosure, a packing case assembly includes a plurality of seals, a housing, an end plate, one or more temperature sensors, and one or more pressure sensors. The housing is configured to hold at least two of the seals. The end plate is coupled to the housing. The one or more temperature sensors are installed in a housing of the packing case and configured to sense a temperature in the packing case. The one or more pressure sensors coupled to the housing and configured to sense a pressure in one or more spaces in the packing case.

In another aspect of the disclosure, a method of detecting wear in seals of a progressive sealing system includes: receiving signals from one or more temperature sensors coupled to a housing of the progressive sealing system; computing, from the signals, a temperature associated with the temperature sensor at two or more times; and determining, at least in part from the computed temperatures at the two or more times, a degradation indicator for at least one of the seals of the progressive sealing system.

In some implementations, the method includes sensing pressure in one or more spaces in the progressive sealing system, and determining, at least in part from sensor pressures at the two or more times, a degradation indicator for at least one of the seals of the progressive sealing system.

The details of one or more implementations of the subject matter of this disclosure are set forth in the accompanying drawings and the description. Other features, aspects, and advantages of the subject matter will become apparent from the description, the drawings, and the claims.

BRIEF DESCRIPTION OF DRAWINGS

Like reference numbers in different figures indicate similar elements.

DETAILED DESCRIPTION

In various implementations, a gas processing system includes a system that monitors a progressive sealing system of the gas processing system. The monitoring system can use measurements of temperature, pressure, or both, to determine indicators of the condition of the seals, and to estimate or predict the stage of life of the seals in the progressive sealing system.

FIGS. 1 through 6 illustrate a compressor that can be provided with instrumentation such as described herein for monitoring conditions of seals of a gas processing system.

For explanatory purposes, when describing the relative position of components or features of a system, "driver-side" may also be referred to herein as "crank-side" or "outside". "Cylinder-side" may also be referred to as "head-side".

Figure 1:
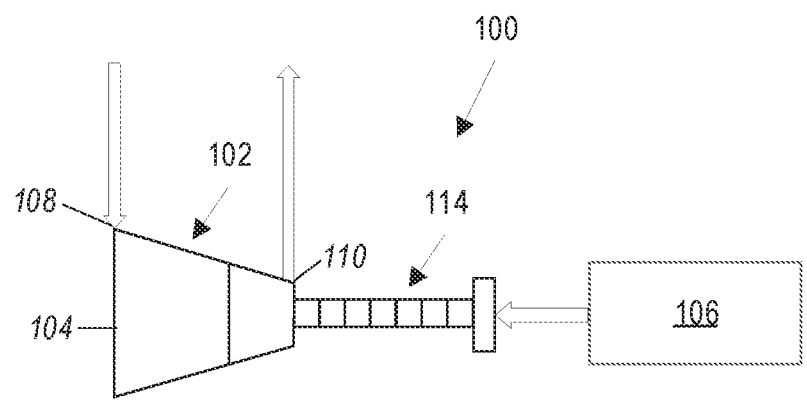
FIG. 1 schematically represents a single stage gas processing system with a multistage sealing system.

Referring first to FIG. 1, gas processing system 100 includes a compressor 102 having a vessel 104 and a driver 106. Vessel 104 defines a cavity with a process gas inlet 108 and a process gas outlet 110. Compressor 102 can be, for example, a positive displacement compressor. In some cases, compressor 102 is a reciprocating compressor, such as a double acting compressor. Vessel 104, configured to contain process gas, is operatively coupled to a shaft that extends into the compressor. A multistage sealing system 114, represented here by a series of boxes along the shaft, inhibits process gas leakage along the shaft. In some embodiments, adjacent seals are adjacent portions of a continuous labyrinth seal. The shaft transfers mechanical energy to process gas in vessel 104 (e.g., by or translating along its longitudinal axis), and extends through multistage sealing system 114 into the cavity.

Driver 106 supplies mechanical energy to operate gas processing system 100. In some embodiments, driver 106 may be, for example, an internal combustion engine with a crankshaft, or an electric motor that drives a shaft of compressor 102.

Figure 2:
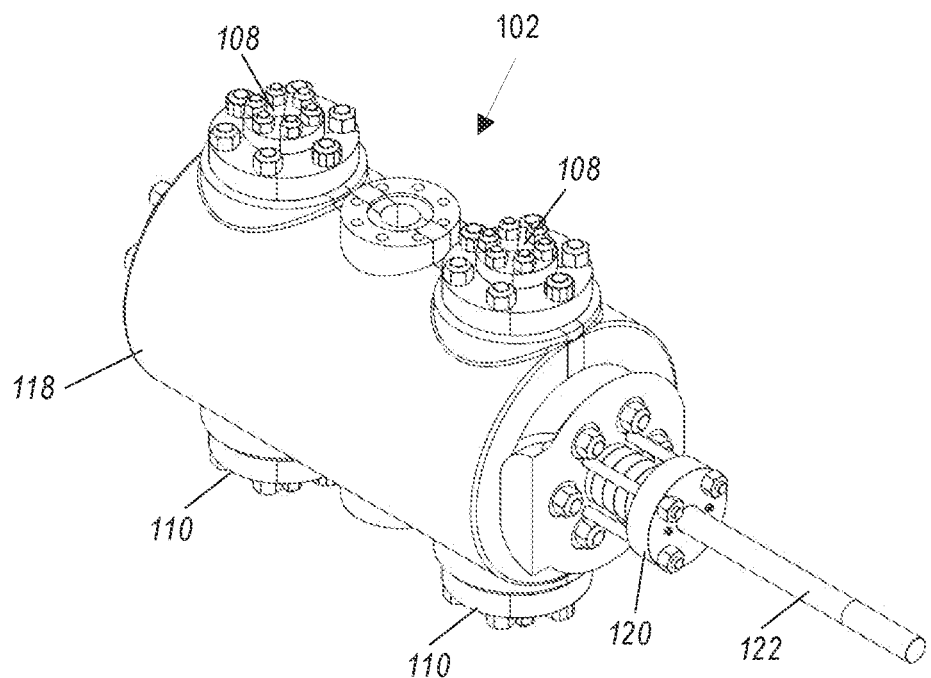
FIG. 2 is a perspective view of a portion of a reciprocating shaft compressor.

Referring next to FIG. 2, a cylinder of compressor 102 has a housing 118 and an end plate 120 that bolts to the housing and through which a shaft 122 extends. In some cases, housing 118 is in two pieces, with a cast iron piece forming the main cylinder and a steel bulkhead bolted to the end of the cylinder to contain the sealing system. Compressor 102 can be a linear reciprocating compressor with two inlets 108 and two outlets 110. Shaft 122 can be operatively coupled to a driver.

Figure 3:
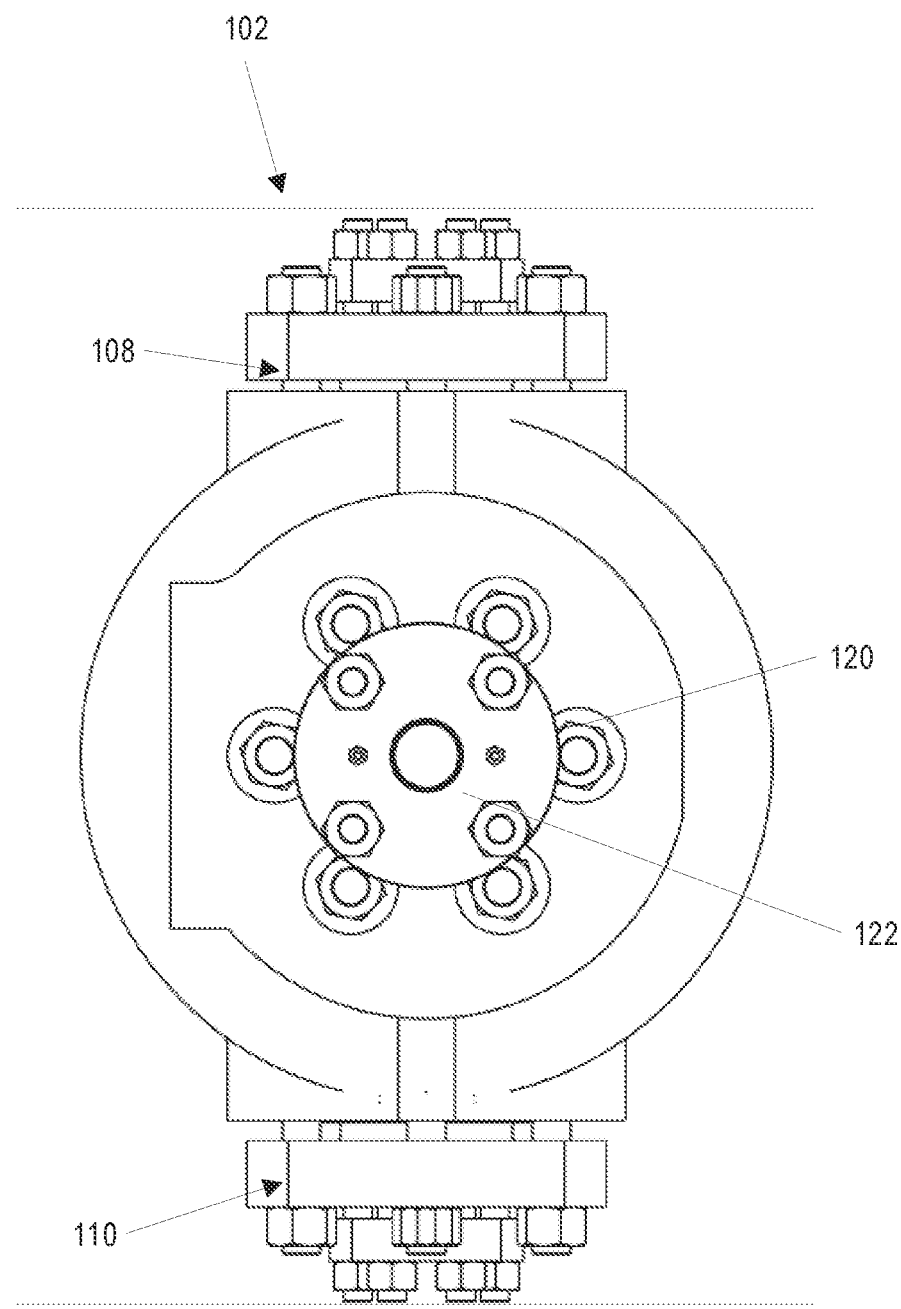
FIG. 3 is an end view of the compressor portion of a gas processing system.

FIG. 3 is an end view of the compressor portion of a gas processing system. Compressor 102 includes end plate 120, inlets 108, and outlets 110. Shaft 122 passes through end plate 120.

Figure 4:
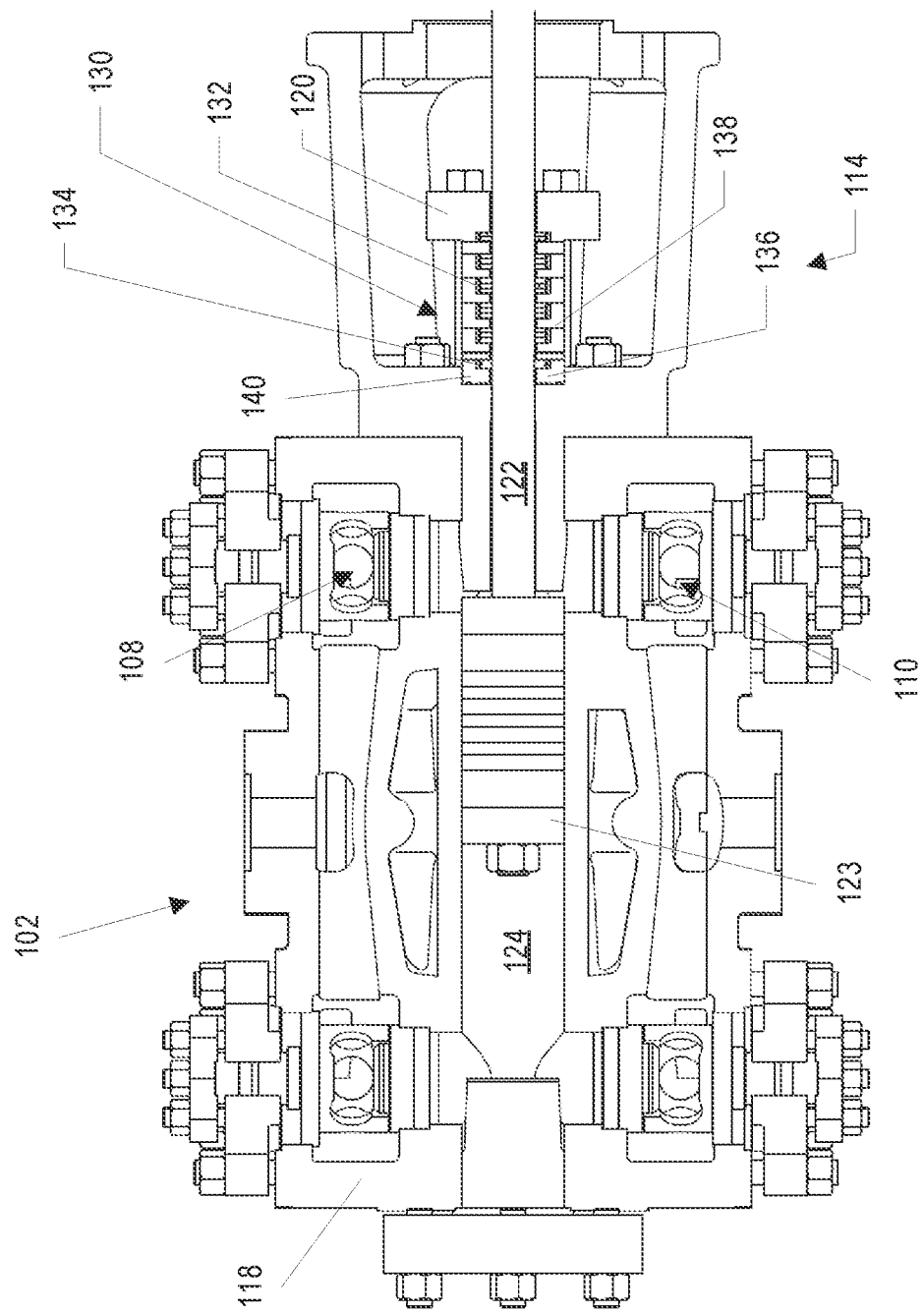
FIGS. 4 and 5 are cross-sectional views showing the shaft at opposite ends of its stroke.
Figure 5:
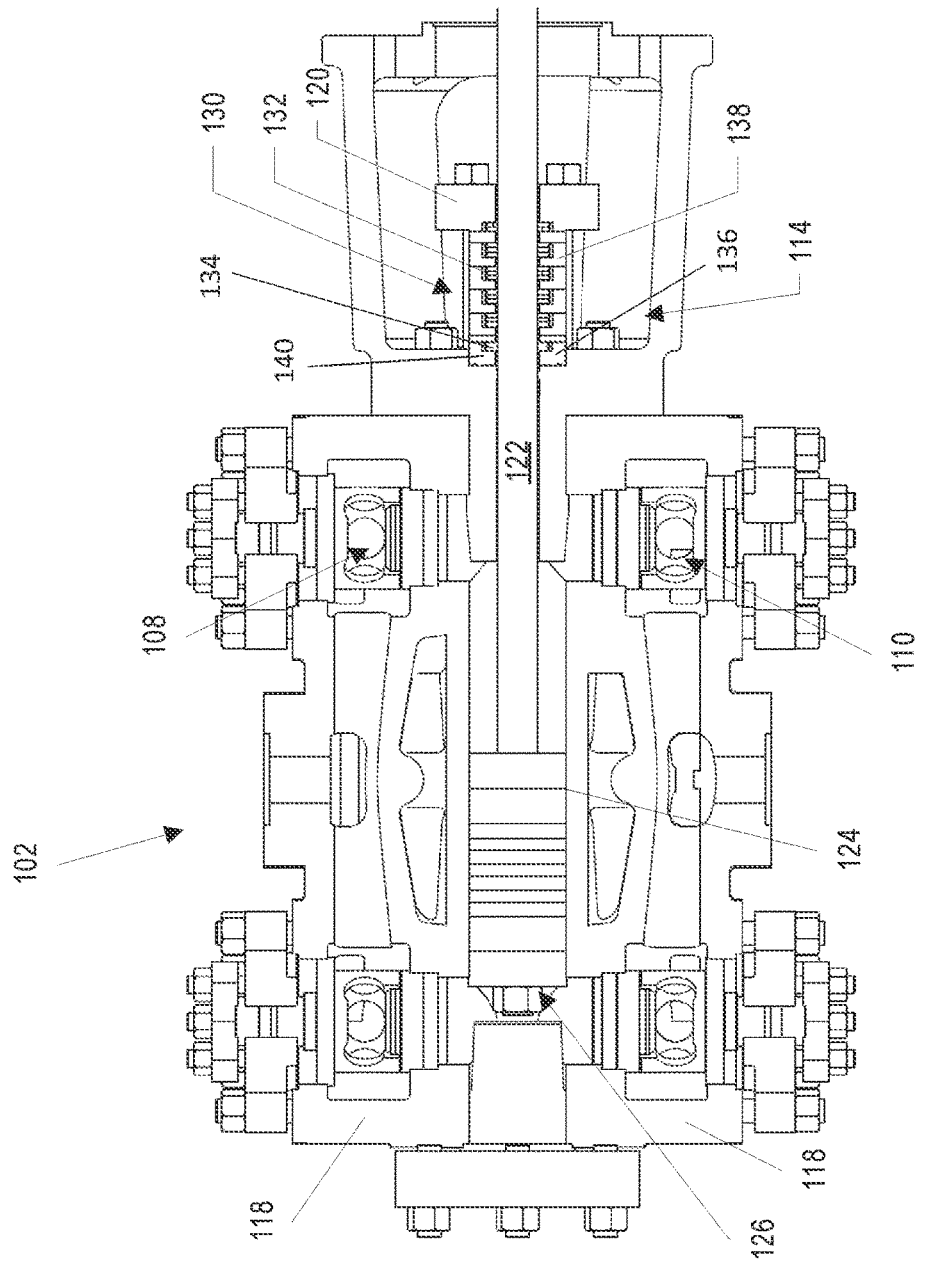

Referring next to FIGS. 4 and 5, piston 124 is provided at the end of shaft 122. Housing 118 defines cylinder chamber 126.

The end of shaft 122 that is opposite piston 124 can be coupled to a driver. In operation, piston 124 and a portion of shaft 122 can be driven to reciprocate in cylinder chamber 126, for example, between the positions shown in FIGS. 4 and 5 (the shaft of compressor 102 that carries piston 124 may also be referred to as a "rod").

Multistage sealing system 114 is disposed about shaft 122. In FIGS. 4 and 5, progressive sealing system 114 is implemented by way of a packing case 130. In this example, multistage sealing system 114 includes six seals 132 spaced along the shaft, and a pressure breaking rod ring 134. Multistage sealing system 114 can be provided in the form of a packing case for compressor 102. Each seal can include multiple sealing elements or rod rings stacked close together on the shaft, to form a tight series of sealing interfaces with the shaft. In this case, pressure breaking rod ring 134 is a single element seal forming the first seal of the multistage sealing system. Pressure breaking rod ring 134 can control leakage to regulate backflow into the cylinder during the suction stroke and to avoid damaging rings and disengaging them from the rod. Pressure breaking rod ring 134 may also reduce gas flow out of the cylinder on the discharge stroke. In certain implementations, pressure breaking rod ring 134 can be modified to provide an optimal effective orifice in relation to the flow expected to be returned from behind the rod ring to the inlet, as discussed below. The term 'seal' does not imply that there is zero clearance at the shaft surface, or that there is no leakage across the seal. As will be understood by those working in the field of high pressure gas machinery, some leakage will be expected past high pressure differential seals, and may even be necessary to avoid high friction and premature seal failure. Expansion of gas between the seals and shaft surface can create a beneficial cooling of the shaft, resulting in lower seal wear.

As shown in these cross-sections, the multistage sealing system comprises and pressure breaking rod ring housing 136 and multiple seal housings 138 stacked along the shaft and disposed within a bore of housing 118. The innermost seal housing is sealed against a face of the cylinder housing by a nose gasket 140. Each seal housing 138 contains a respective seal 132, with the outermost seal (a dual acting ring) contained within end plate 120. Each seal 132 can be a stack of multiple elements, such as a seal ring sandwiched between two other rings that support the sealing function.

Compressor cylinder inlets 108 and outlets 110 of gas processing system 100 each feature a one-way valve that allows flow either into (inlet) or out of (outlet) the compressor cylinder, while inhibiting flow in the opposite direction. Each valve can have multiple flow apertures in parallel. The inlets and outlets operate in pairs, each pair operating in a respective stroke direction of the shaft. For example, during the stroke of the piston from right to left there will be an opening of the right inlet 108 and the left outlet 110, at different points during the stroke. Similarly, during the return stroke from left to right there will be an opening of the left inlet 108 and the right outlet 110 and different points during the stroke, while the right inlet and left outlet remain closed. During this return stroke from left to right, the seal end of the cylinder will be subjected to a rise of pressure to at least the outlet pressure of the compressor. This high pressure will be progressively reduced along the shaft through various stages, beginning with pressure breaking rod ring 134. During the stroke from right to left, the instantaneous pressure at the pressure breaking rod ring will at times be below the compressor inlet or suction pressure, and flow can be in the opposite direction, toward the sealing system. Thus, not only does the sealing system need to withstand high pressures it must also accommodate extreme pressure waves or cycles that may fluctuate very rapidly.

Figure 6:
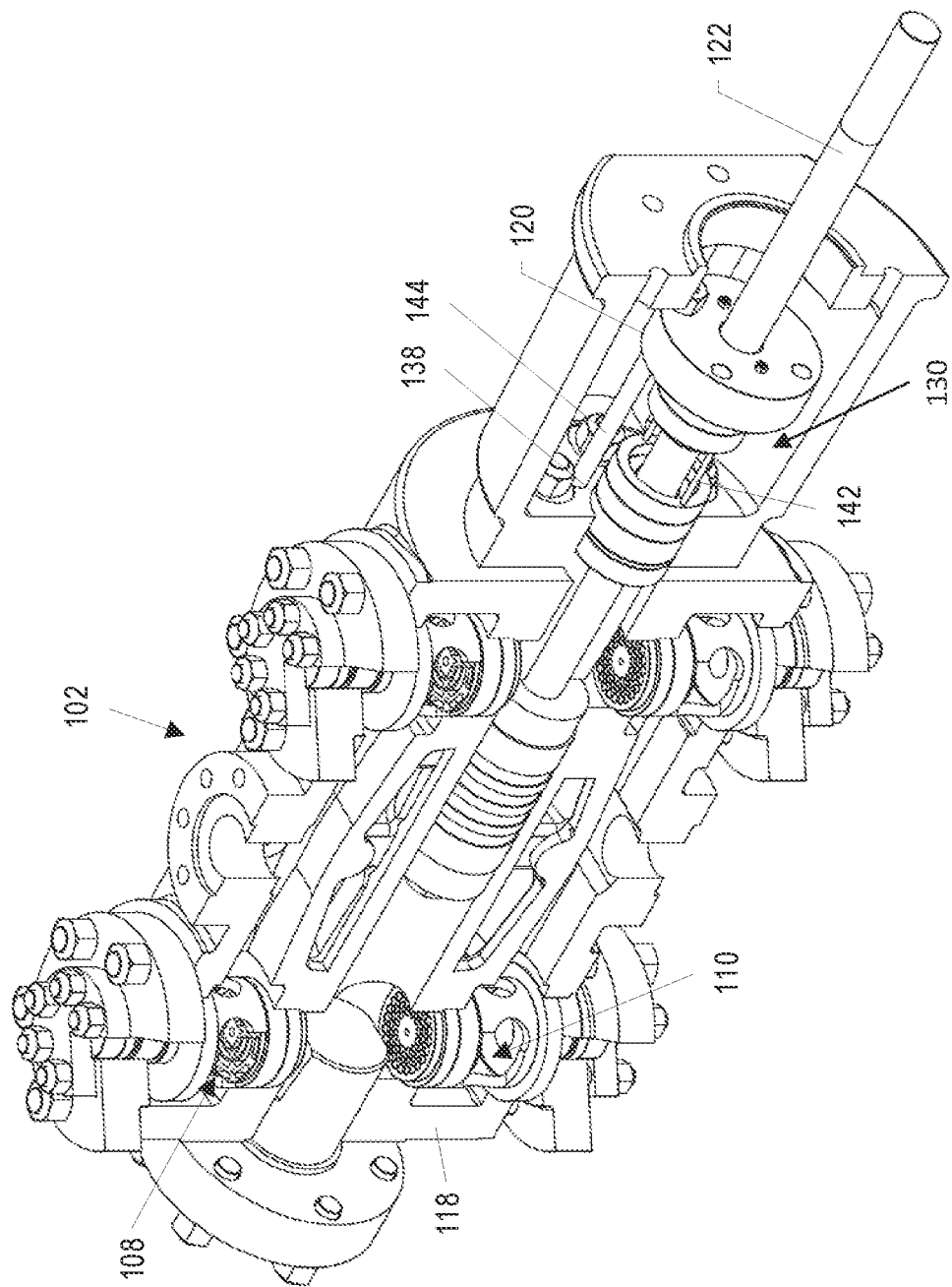
FIG. 6 is an exploded view of the compressor portion of FIG. 3.

Referring next to FIG. 6, end plate 120 and its connected stack of seal housings 138, aligned and held together by tie rods 142, is inserted into the bore of compressor housing 118 and held in place by housing bolts 144. The seal housings are all connected axially to end plate 120 by tie rods 142 threaded into the distal seal housing containing the pressure breaking rod ring, to hold the stack of seal housings together for transport and assembly. Tie rods 142 can also provide an alignment function.

Figure 7:
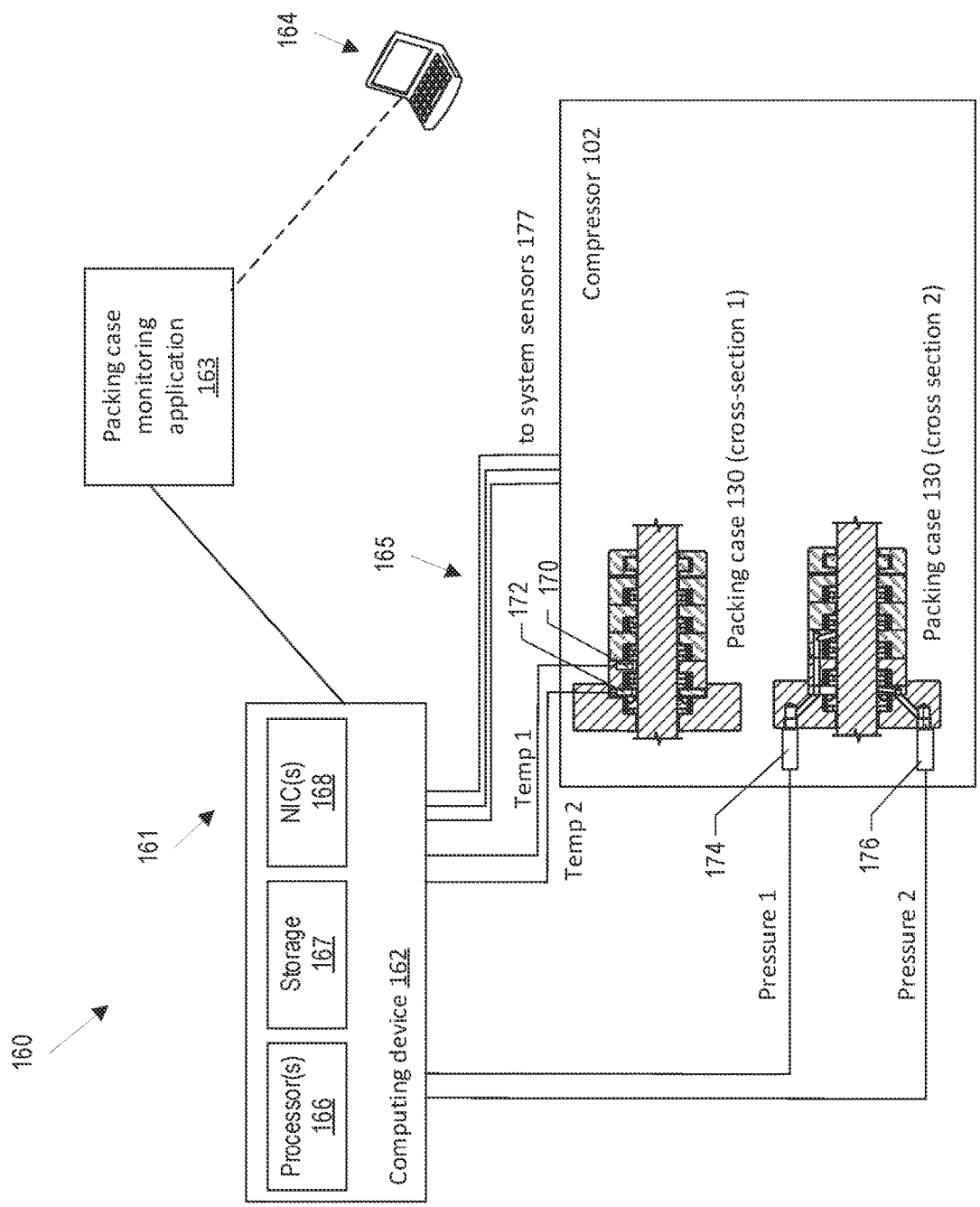
FIG. 7 is a block diagram of a compressor system having a packing case monitoring system according to some implementations.

FIG. 7 is a block diagram of a compressor system having a packing case monitoring system according to some implementations. System 160 includes compressor 102 and packing case monitoring system 161. Compressor 102 includes packing case 130. Packing case monitoring system 161 includes computing device 162, monitor application 163, user device 164, and sensors 165.

Computing device 162 includes one or more processor(s) 166, memory 167, and network interface controller 168. Memory 167 provides data storage of suitable size and format. Network interface controller 168 can facilitate communication of the computing device 162 with other devices (for example, external monitoring devices and/or sensors) over one or more wired or wireless networks.

Temperature sensors 170 and 172 and pressure sensors 174 and 176 emit signals that include sensor data describing conditions in or related to packing case 130. Sensor data is communicated from temperature sensors 170 and 172 and pressure sensors 174 and 176 to computing device 162. In some implementations, temperature sensors 170, 172, pressure sensors 174, 176, and system sensors 177 digitize the signals that communicate the sensor data before sending the signals to the computing device.

The computations and analysis based on the sensor data can be performed at least partly by computing device 162, e.g., by processes that execute on the processor(s) 166. In some implementations, computation and analysis of sensor data is performed by one or more computing systems coupled to computing device 162, such as a remote device connected to computing device 162 over a network.

Computing device 162 can provide notifications to an operator about conditions or maintenance of packing case 130. For example, computing device 162 can provide notifications about degradation of seals in packing case 130.

In some implementations, computing device 162 provides notifications by way of monitor application 163. Monitor application 163 is coupled to user device 164. User device 164 can include a display that allows a user to view temperature and pressure readings, notifications, and other information.

In some implementations, packing case monitoring system 161 acquires data about seal packing case life. The information acquired by the monitoring system can be used to set maintenance schedules for compressor systems.

Figure 8:
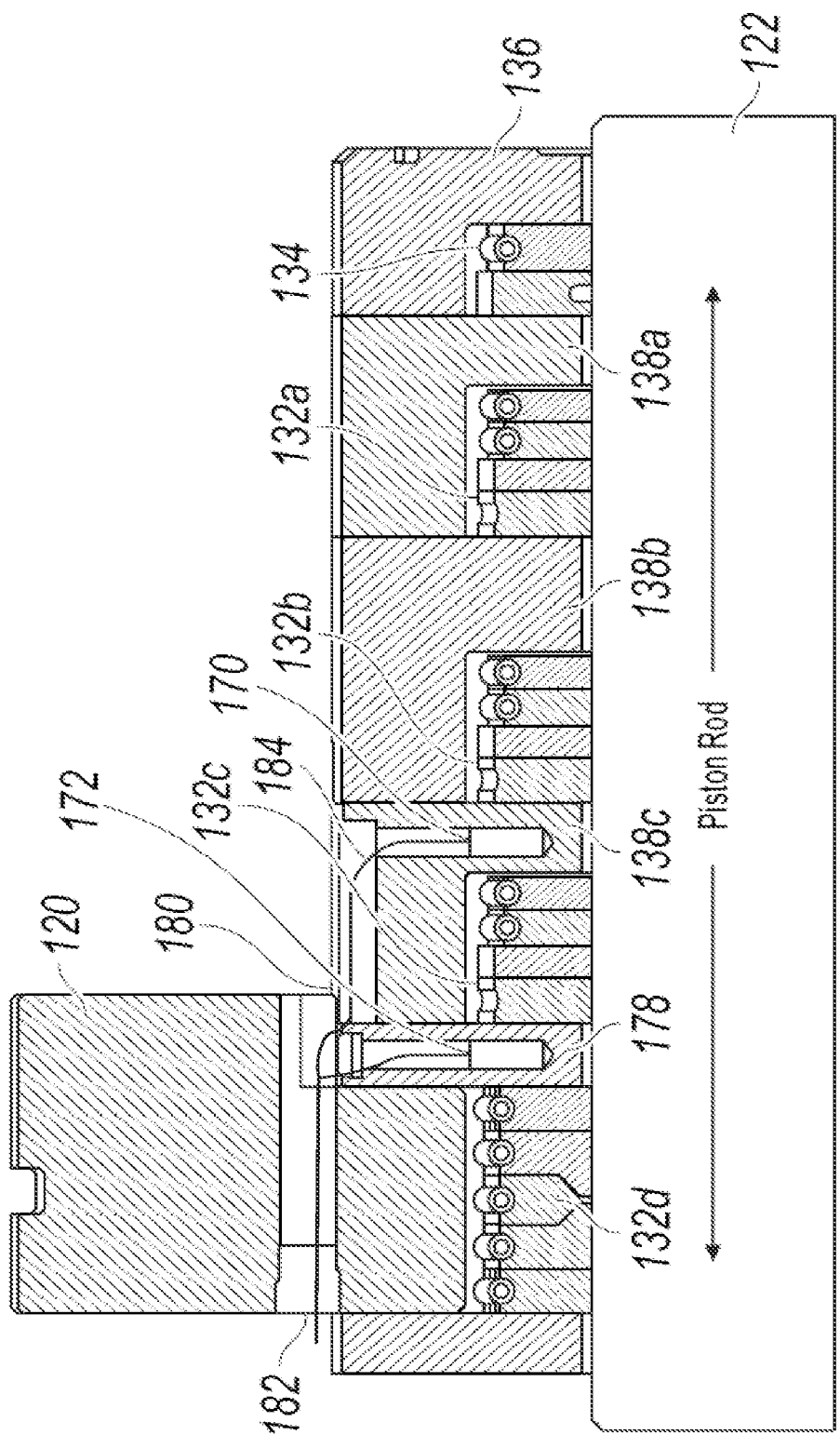
FIG. 8 is a cross-sectional view of a packing case including temperature sensors according to some implementations.

FIG. 8 is a cross-sectional view of a packing case including temperature sensors according to some implementations. Packing case 130 includes seals 132a, 132b, 132c, and 132d. Pressuring breaking rod ring 134 is held in pressure breaking rod ring housing 136. Each of seals 132a, 132b, 132c, and 132d can include one or more seal elements and one or more back-up rings. Each of seal housings 138a, 138b, and 138c can be a cup with a through-bore that receives shaft 122, and a larger bore that accommodates the rod rings of its corresponding seal.

Packing case 130 defines pressure spaces along the shaft surface, bounded by the various seals. Moving from the high-pressure end of the sealing system to the atmospheric pressure end, high-pressure process gas leaking past the pressure breaking rod ring first reaches intermediate pressure space between pressure breaking rod ring 134 and the first seal 132a.

Further leakage past seal 132a reaches a pressure space, which may be at a pressure, for example, of about 500 psig. Thus, in operation the multistage sealing system defines a series of pressure spaces at progressively decreasing pressures along the shaft, with each seal creating a differential pressure between two pressure spaces. The amount of running leakage past a seal, and the pressure differential across the seal, are interrelated. In general, the higher the pressure differential across a seal, the greater the running friction of the seal and the greater the heat generation at the seal.

Temperature sensors 170 and 172 are axially spaced from one another along packing case 130. Temperature sensor 170 is installed in housing 136c. Temperature sensor 172 is installed in plate 178. Plate 178 is held in end plate 120. In this example, 170 and 172 flank seal 132c. Temperature sensor 170 is between the second and third seal to the cylinder-side of pressure breaking ring 134.

Temperature sensors 170, 172 can provide signals to a computing device (e.g. computing device 162 described above relative to FIG. 7). Data from temperature sensors 170 and 172 can be used in provide indicators relating to the condition of one or more of seals 132a, 132b, 132c, and 132d.

In the example shown in FIG. 7, temperature sensors 170 and 172 are installed in radial bores in housing 138c and plate 178, respectively. Each of the bores ends near the inner surface of the housing (e.g., close to annular space between shaft 122 and the housing 138c). Each of the bores is adjacent to seal 132c. Temperature sensor 172 is on the cylinder side. In some implementations, temperature sensors 170 and 172 are thermocouples.

Figure 9:
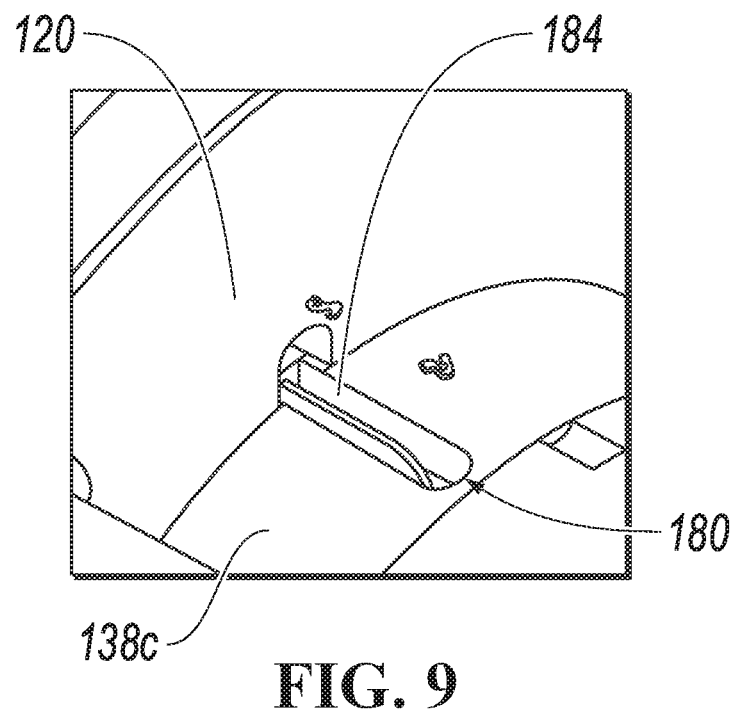
FIG. 9 illustrates a temperature sensor in a packing case.
Figure 10:
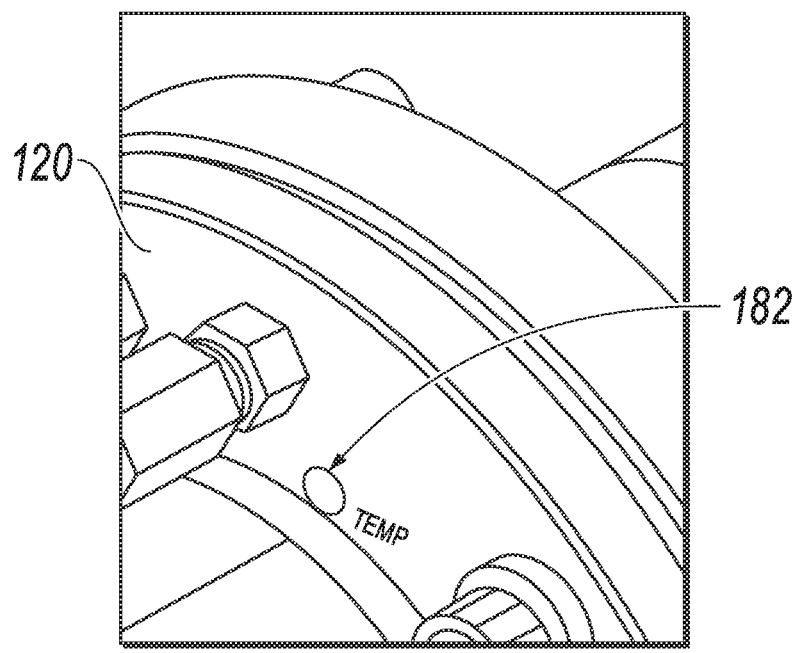
FIG. 10 illustrates the reverse side of an end plate of a packing case including a passage for a temperature sensor wire.

FIG. 9 illustrates a temperature sensor in a packing case. Seal housing 132c of packing case 130 includes a groove 180 on the exterior surface of housing. Groove 180 runs axially along housing 138c to adjoining hole 182 in end plate 120. Temperature sensor wire assembly 184 resides in groove 180. FIG. 10 illustrates the reverse side of end plate 120, with hole 182 for passage of temperature sensor wire assembly 184.

Figure 11:
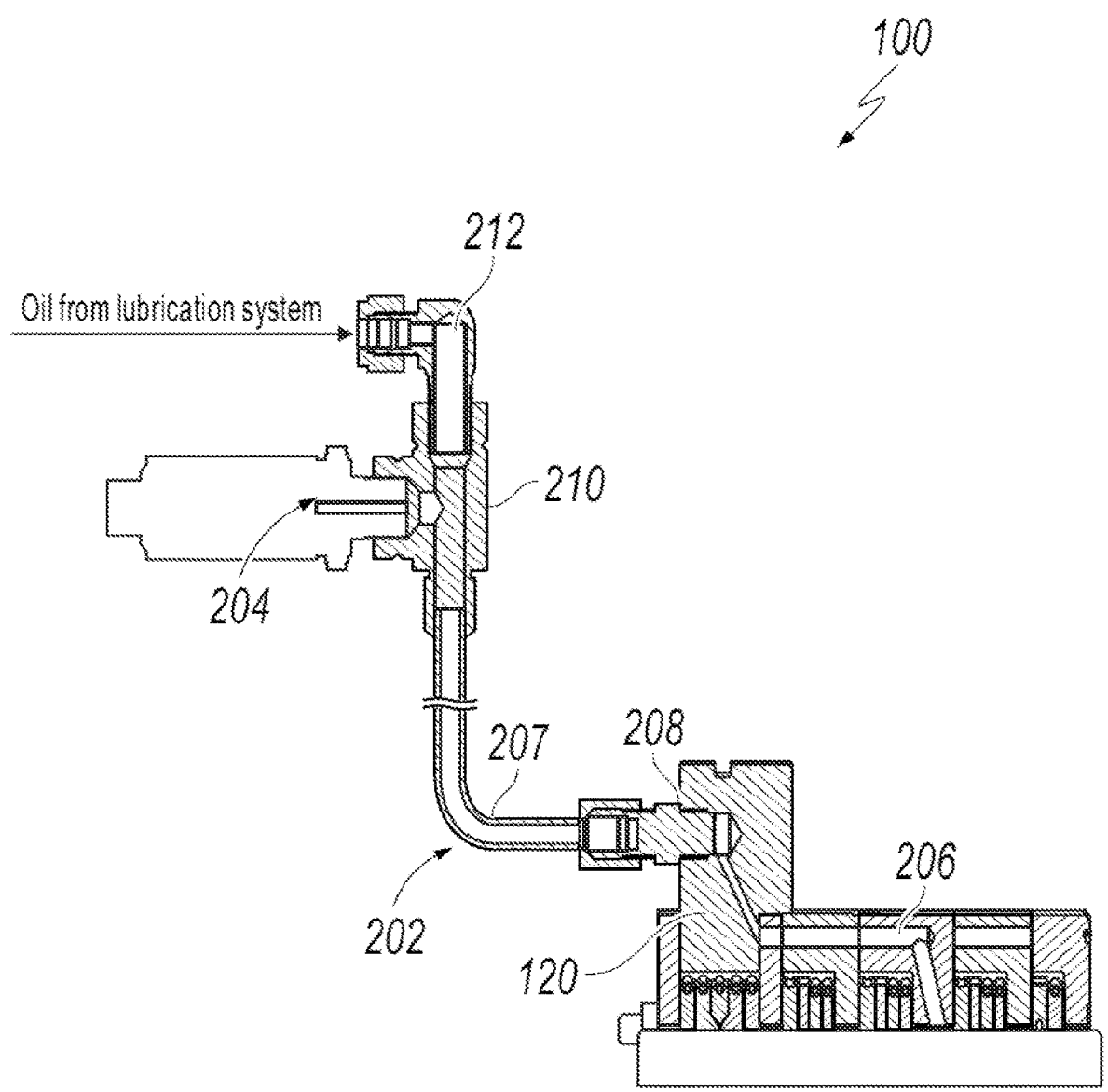
FIG. 11 illustrates a pressure sensor for sensing a dynamic pressure according to some implementations.

FIG. 11 illustrates a pressure sensor for sensing a dynamic pressure according to some implementations. System 100 includes lube line 202 and pressure sensor 204. Lube line 202 includes internal passages 206 and external line 207. External line 207 is coupled to internal passages 206 via port 208 in end plate 120. Oil can be fed to lube line 202 through fitting 212. Pressure sensor 204 is fluidly coupled to lube line 202 by way of T connector 210.

Pressure sensor 204 can be used to sense a dynamic pressure in packing case 130. In some implementations, pressure sensor 204 senses pressure on the cylinder-side of temperature sensors in the packing case (e.g., temperature sensors 170 and 172 described above relative to FIG. 8).

Figure 12:
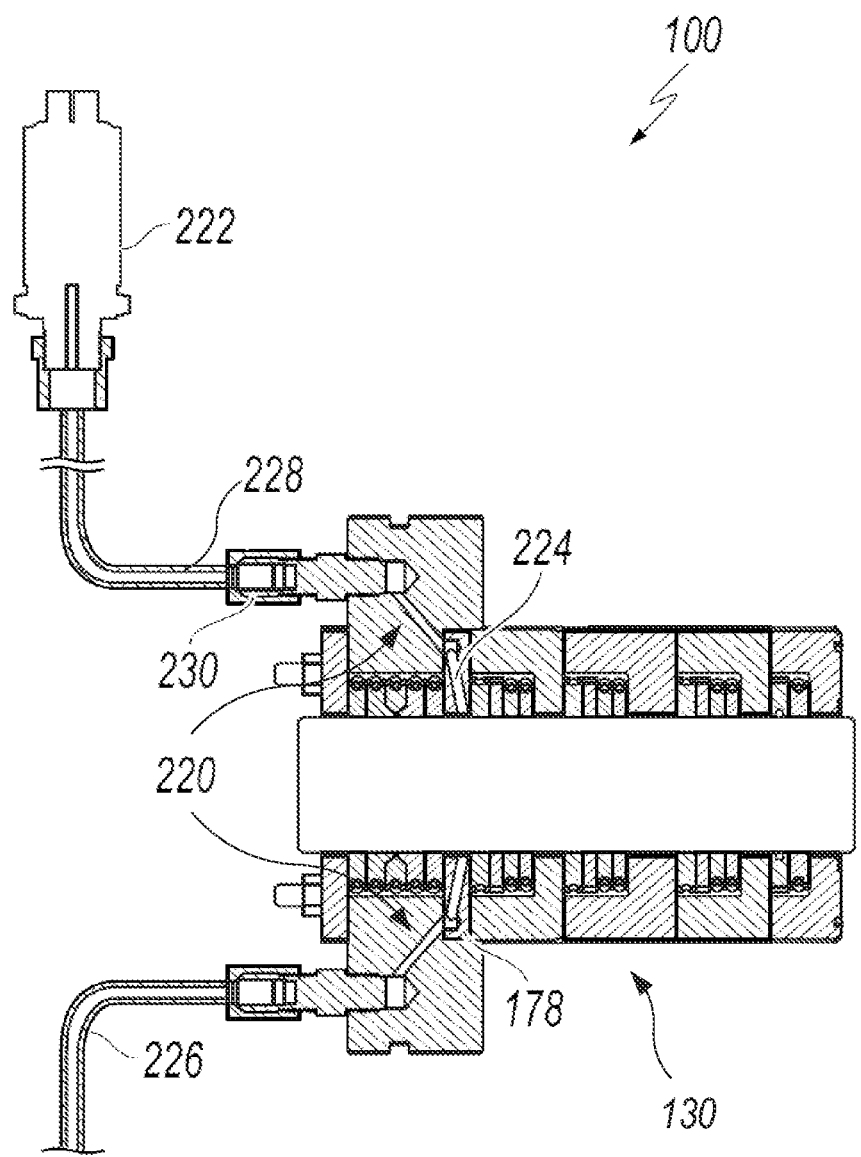
FIG. 12 illustrates a pressure sensor for sensing a dynamic pressure according to some implementations.

FIG. 12 illustrates a pressure sensor for sensing a dynamic pressure according to some implementations. System 100 includes vent line 220 and pressure sensor 222. Vent line 220 includes internal vent passages 224, a first external vent line 226, and a second external vent line 228. First external vent line 226 and second external vent line 228 are in fluid communication internal vent passages 224. In this example, first external vent line 226 is used to allow venting of the packing case to atmosphere. Internal vent passages 224 are coupled to pressure sensor 222 by way of port 230 and second external vent line 228. Pressure sensor 222 can be used to sense a static pressure in packing case 130. In some implementations, pressure sensor 222 senses pressure on the driver-side of temperature sensors in the packing case (e.g., temperature sensors 170 and 172).

Figure 13:
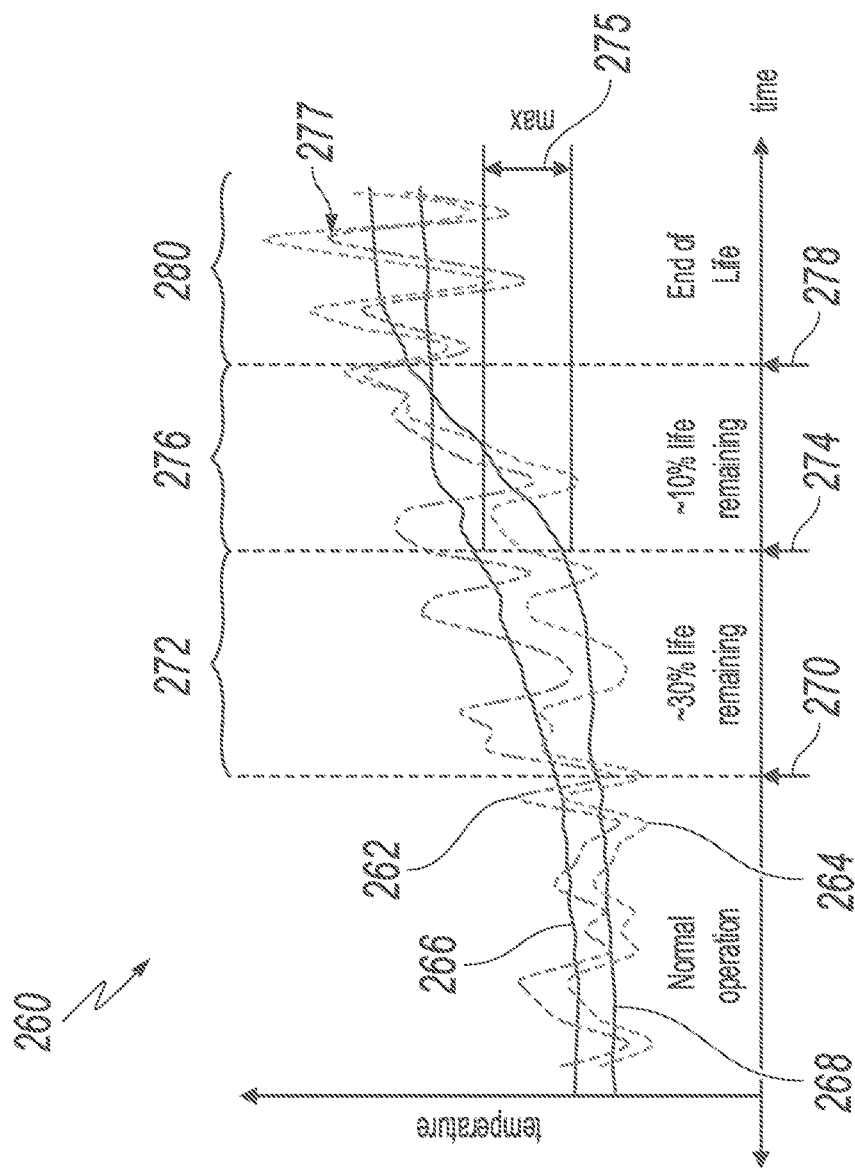
FIG. 13 is a graph illustrating temperature monitoring in a packing case of a compressor using temperature sensors installed in the housing of the packing case.

FIG. 13 is a graph 260 illustrating temperature monitoring in a packing case of a compressor using temperature sensors installed in the housing of the packing case. In this example, curve 262 may correspond to temperatures sensed by temperature sensor 170 (TC1) on the cylinder-side of the third seal (132c) shown in FIG. 8. Curve 264 may correspond to temperatures sensed by temperature sensor 172 (TC2) on the driver-side of the third seal (132c) shown in FIG. 8. Curve 266 may represent a trend line computed from temperatures sensed from TC1. Curve 268 may represent a trend line computed from temperatures sensed from TC2.

Initially, the compressor is in a normal operation stage. At time 270, the monitoring system may detect the onset of rise in TC1 and/or divergence of TC1 from TC2. The rise in TC1 is reflected in the rise in temperature of curve 266.

Time 270 may be associated with one or more notifications provided to a user, such as a warning. During stage 274, operators may be alerted and pre-planning intervention measured carried out. Stage 274 may be associated with an assumed approximate life remaining (in this example, 30% life remaining).

Throughout stage 272, the system may continue to sense temperatures and compute differential temperatures between sensors. Over this stage, temperatures may continue to diverge from one another.

At time 274, the system detects that a maximum temperature differential has been reached. Maximum temperature differential is indicated by max temperature differential 275 between curve 266 and curve 268.

Time 274 may be associated with one or more additional notifications provided to a user, such as a maintenance alert. Stage 276 may be associated with an assumed approximate life remaining (in this example, 10% life remaining). Stage 276 may correspond to an ideal MRO period for seals in the packing case.

Throughout stage 276, the system may continue to sense temperatures and compute differential temperatures between sensors. Over this stage, temperature may converge until a crossover point is reached. Also over this stage, temperature variation of each temperature sensor from one time to another may become more and more variable.

At time 278, the system may detect temperature variations that exceed a pre-determined threshold. Temperature variations are reflected, for example, in larger swings in each of curves 262 and 264 (seen, for example, at 277).

Time 278 may be associated with one or more additional notifications provided to a user, such as a warning to the user that the risk of failure is high. Stage 280 may be associated with an assumed approximate life remaining (in this example, end of life). Stage 280 may correspond to high vent leakage and a risk of total failure. Over this stage, temperature may converge until a crossover point is reached. Temperature variation of each temperature sensor from one time to another may become more variable. In some cases, though actual/measured temperatures are highly variable relative to ambient and operating conditions, the variation in temperature measurement at any given time may track one another closely.

Figure 14:
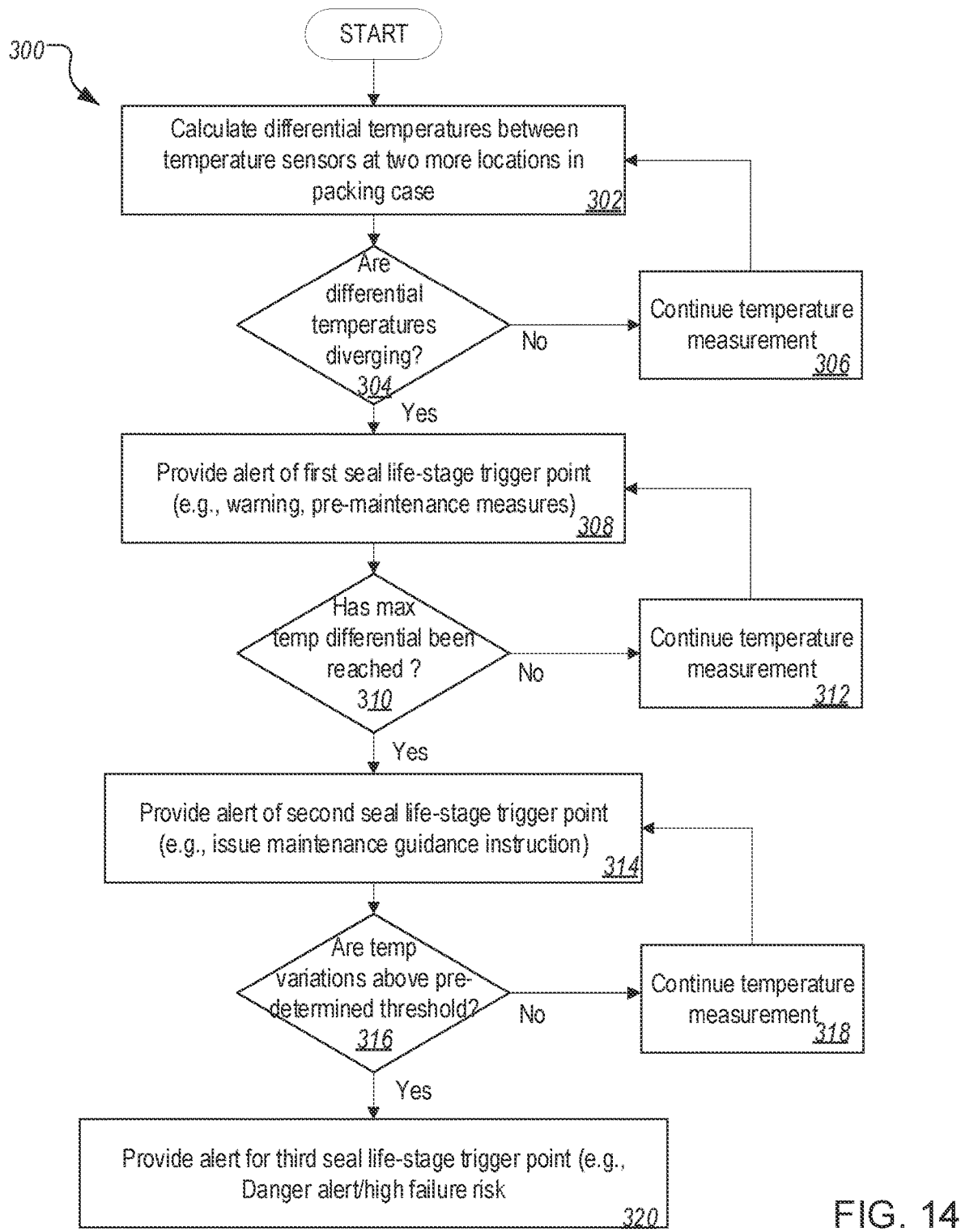
FIG. 14 illustrates a process of monitoring a packing case with temperature measurements according to some implementations.

FIG. 14 illustrates a process 300 of monitoring a packing case with temperature measurements according to some implementations. Differential temperatures between temperature sensors at two more locations in packing case are calculated (302). The temperature sensors can be, for example, as installed in the packing case described above relative to FIG. 8.

Based on the calculations, the system determines whether differential temperatures are diverging (304). If differential temperatures are not diverging, the system continues measuring temperatures (306). If the differential temperatures are diverging (and/or, if the temperature of TC1 starts to rise), the system provides a first seal life stage alert (308). In one example, differential temperature divergence corresponds to time 270 on FIG. 13).

As the compressor system continues to operate (e.g., stage 272 in FIG. 13), the system continues to calculate differential temperatures. Based on the calculations, the system determines whether a maximum temperature differential has been reached (310). If a maximum has not been reached, the system continues measuring temperatures (312). If the maximum differential temperature has been reached, the system provides a second seal life-stage alert (314. In one example, the maximum temperature differential corresponds to time 274 on FIG. 13.) The second stage indicator may trigger an action by maintenance personnel to replace the seals of the packing case.

As the compressor system continues to operate (e.g., stage 276 in FIG. 13), the system continues to calculate differential temperatures. Based on the calculations, the system determines whether variations in temperatures are above a pre-determined threshold. If the threshold has not been reached, the system continues measuring temperatures (318). If the threshold has been reached, the system provides a third seal life-stage alert (320). In one example, the maximum temperature differential corresponds to time 278 on FIG. 13.) The third stage indicator may be associated with end-of-life of the seals.

Figure 15:
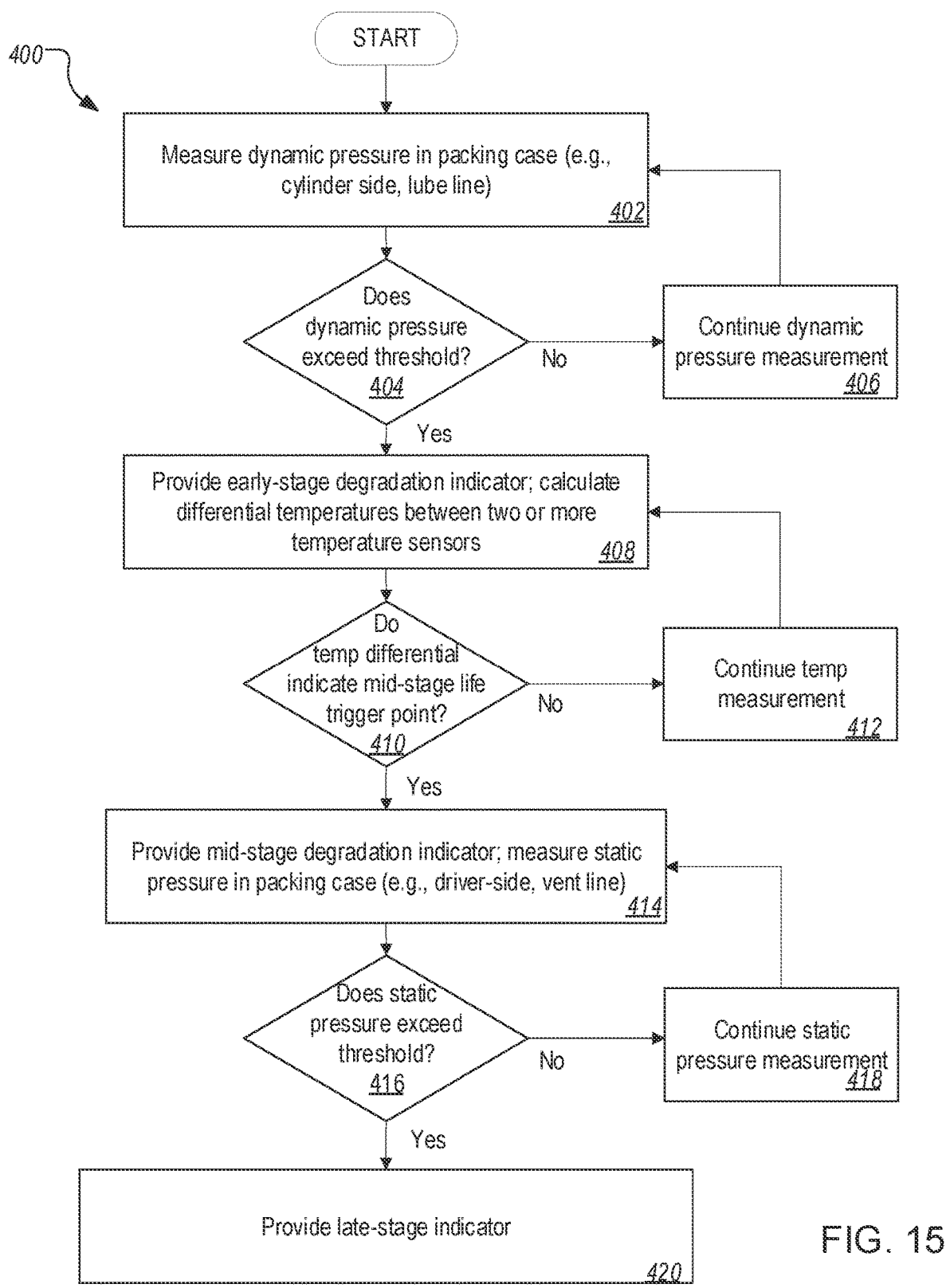
FIG. 15 illustrates a process of monitoring a packing case with temperature and pressure measurements according to some implementations.

FIG. 15 illustrates a process 400 of monitoring a packing case with temperature and pressure measurements according to some implementations. The temperature sensors and pressure sensors can be, in one implementation, as installed in the packing case described above relative to FIGS. 8, 9, and 10.

Dynamic pressure is measured in packing case (e.g., cylinder side, lube line) (402) and pressures are calculated. Based on the calculations, the system determines whether dynamic pressure exceeds a pre-determined threshold (404). If dynamic pressure does not exceed the threshold, the system continues measuring dynamic pressure (406). If dynamic pressure exceeds the threshold the system provide an early-stage life degradation indicator. (408).

As the compressor system continues to operate, the system calculates differential temperatures between two or more temperature sensors. Based on the calculations, the system determines whether a mid-stage life trigger point has been reached (410). If the mid-stage life trigger point has not been reached, the system continues measuring temperatures (412). If the mid-stage life trigger point has been reached, the system provides a mid-stage degradation indicator (414). The mid-stage indicator may trigger an action by maintenance personnel to replace the seals of the packing case.

As the compressor system continues to operate, the system measures static pressure in the packing case. Based on the calculations, the system determines whether a static pressure threshold has been reached (416). If the static pressure threshold has not been reached, the system continues measuring pressures (418). If the static pressure threshold has been reached, the system provides a late-stage degradation indicator (420). The late-stage indicator may be associated with end-of-life of the seals. In various implementations, a late stage indicator is based on a deduced leakage flow rate, pressure measurement, or a combination of both.

In some implementations, the early-stage degradation indicator is obtained from inboard instrument data, such as dynamic pressure measured using a pressure sensor in fluid communication with a lube line. In some implementations, the late-stage degradation indicator is obtained from inboard instrument data, such as a static pressure measured using pressure sensor in fluid communication with a vent line. The late-stage degradation indicator can also be determined based on a deduced leakage flow rate.

In some of the processes described above, the system determined seal condition indicators based on temperature data generated from temperature sensors coupled to a packing case. In some implementations, seal condition indicators are determined based on data from pressure sensors coupled to the packing case. In some implementations, seal condition indicators are determined based on data from a combination of temperature sensors and pressure sensors that are coupled to the packing case.

In some of the processes described above, the system determines a seal degradation indicator.

In the implementation described above with respect to FIG. 8, a pair of temperature sensors flank the third seal from the pressure breaker of the packing case. The temperature sensors are axially spaced from one another, each on one side of the seal. In other implementations, a monitoring system include temperature sensors at other locations in the housing. In certain implementations, a packing case monitoring system includes only one temperature sensor, or more than two temperature sensors.

Temperature sensors can also be circumferentially spaced from one another. For example, a first temperature sensor can be at the bottom of the packing case between the first and second seals, while a second temperature sensor is between the second and third seals at the top of the packing case.

Figure 16:
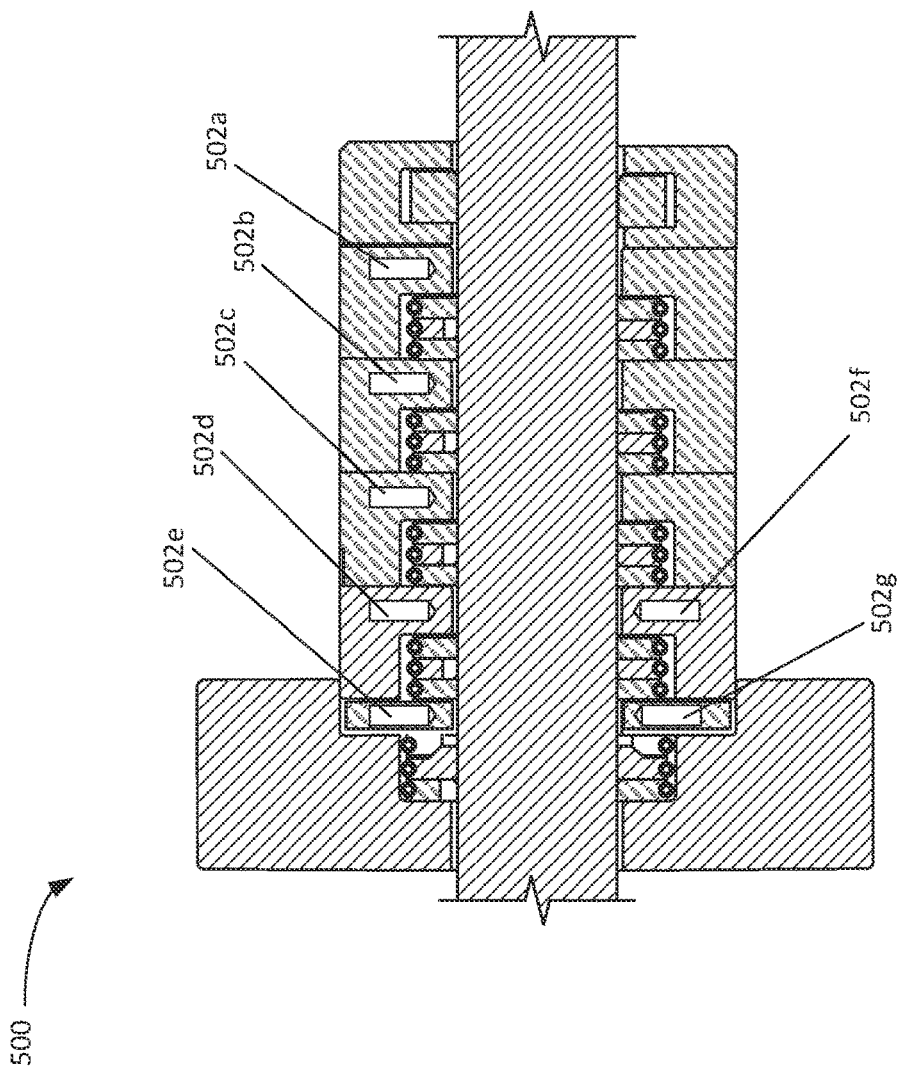
FIG. 16 illustrates a packing case with temperature sensors between each of the seals of a packing case according to some implementations.

FIG. 16 illustrates a packing case with temperature sensors between each of the seals of a packing case according to some implementations. Packing case 500 includes temperature sensors 502a, 502b, 502c, 502d, and 502e. Temperature sensors 502a, 502b, 502c, 502d, and 502e are axially spaced from one another along the length of packing case 500, with one temperature sensor between each pair of adjacent seals. Temperature sensor 502f is circumferentially spaced from temperature sensor 502d. Temperature sensor 502g is circumferentially spaced from temperature sensor 502e.

The above systems have been described with respect to a reciprocating compressor, in which shaft power does work on the process gas to create a high-pressure gas flow that can be put to work elsewhere in the system. Progressive seal monitoring systems as described herein can, also be implemented in other processing systems, such as reciprocating pumps. In addition, monitoring systems such as described herein can be applied to some engines. For example, a progressive seal monitoring system can be included in a linear reciprocating gas engine that uses a high-pressure flow of gas to drive a shaft back and forth in a reciprocating manner.

Monitoring systems, instrumentation, and methods (such as packing case monitoring system 161 described above with respect to FIG. 7) can be implemented in electronic circuitry, computer hardware, firmware, software, or in combinations of these elements. Devices can include input and output devices, a computer processor, and a computer program product embodied in a machine-readable storage device for execution by a programmable processor. Techniques can be performed by a programmable processor executing a program of instructions to perform desired functions by operating on input data and generating appropriate output. Techniques can be implemented in one or more computer programs that are executable on a programmable system including at least one programmable processor coupled to receive data and instructions from, and to transmit data and instructions to, a data storage system, at least one input device, and at least one output device. Suitable processors include, by way of example, both general and special purpose microprocessors. Generally, a processor will receive instructions and data from a read-only memory and/or a random access memory. Storage devices may include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

In an aspect of the disclosure, a monitoring system for a packing case includes one or more temperature sensors, one or more pressure sensors, and a computing device. One or more of the temperature sensors are installed in the housing and configured to sense temperature in at least one location in the packing case. One or more of the pressure sensors are fluidly coupled to one or more spaces in the packing case and configured to sense pressure in at least one location in the packing case. The computing device is communicatively coupled to at least one of the one or more temperature sensors and at least one of the one or more pressure sensors. The computing device is configured to receive signals from the at least one temperature sensor and the at least one pressure sensor; and compute, from signals from at least one of the temperature sensors and the at least one of the pressure sensors, a degradation indicator for at least one of the seals of the packing case.

In some implementations, the one or more temperature sensors include two or more temperature sensors. The computing device is configured to compute, based on signals from the temperature sensors, a temperature differential at two or more times.

In some implementations, at least one of the pressure sensors is coupled to a vent line of the packing case.

In some implementations, at least one of the pressure sensors is coupled to a lube line of the packing case.

In some implementations, a packing case assembly includes a plurality of seals, a housing configured to hold at least two of the seals, an end plate coupled to the housing, one or more temperature sensors, and one or more pressure sensors. The one or more temperature sensors are coupled to a housing of the packing case and configured to sense a temperature in the packing case. The one or more pressure sensors are coupled to the housing and configured to sense a pressure in one or more spaces in the packing case.

In some implementations, a method of detecting wear in seals of a progressive sealing system includes receiving signals from one or more temperature sensors coupled to a housing of the progressive sealing system, computing, from the signals, a temperature associated with the temperature sensor at two or more times, and determining, at least in part from the computed temperatures at the two or more times, a degradation indicator for at least one of the seals of the progressive sealing system.

In some implementations, the method further includes sensing pressure in one or more spaces in the progressive sealing system. and determining, at least in part from sensor pressures at the two or more times, a degradation indicator for at least one of the seals of the progressive sealing system.

As used herein, in the context of a sealing system, "degradation" includes any changes in one or more seals that reduce the effectiveness of the sealing system or move the seal toward the end of its useful life.

As used herein, an "indicator" includes a value, number, code, symbol, description, or other item of information that indicates or describes a condition, status, or level of a component, system, or device. For example, a seal condition indicator may describe a stage in the life of a seal system (e.g., normal operation, replacement recommended, end-of-life reached, failure imminent), or a percentage of life remaining on a seal system.

As used herein, a "predictor" includes an indicator that predicts or estimates a result or outcome relating to a system, component, or device.

As used herein, "chamber" includes an at least partially enclosed space.

As used herein, a "driver" includes a device that supplies mechanical energy to operate a system.

As used herein, a "housing" may completely or only partially enclose the component(s) that it houses.

As used herein, "progressive" refers to a sealing system having multiple sealing members between a high pressure point and a low pressure point. In many cases, such systems progressively reduce the pressure in stages between the high and low pressure points.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A method of monitoring degradation of seals of a packing case, the method comprising:
    receiving signals from a first temperature sensor installed in a first location in a housing of the packing case;
    receiving signals from a second temperature sensor installed in a second location in the housing of the packing case;
    computing, from the signals, a temperature differential between the first temperature sensor and the second temperature sensor at two or more times; and
    determining, at least in part from the temperature differential at the two or more times, a degradation indicator for at least one of the seals of the packing case, wherein the degradation indicator is based at least in part on a maximum differential temperature between the first temperature sensor and the second temperature sensor.

2. The method of claim 1, wherein:
the packing case defines a cylinder-side and a driver-side,
the first location is on the cylinder-side of one of the at least one of the seals of the packing case, and
the second location is on the driver-side of the one of the at least one of the seals of the packing case.

3. The method of claim 1, wherein the first temperature sensor and the second temperature sensor are axially spaced from one another along a length of the packing case.

4. The method of claim 1, wherein at least one of the first temperature sensor or the second temperature sensor is embedded in a bore in the housing of the packing case.

5. The method of claim 1, wherein the degradation indicator is based at least in part on an increase in differential temperature between the first temperature sensor and the second temperature sensor over time.

6. The method of claim 1, wherein the degradation indicator is based at least in part on one or more changes in differential temperature between the first temperature sensor and the second temperature sensor over time.

7. The method of claim 1, wherein the degradation indicator is based at least in part on an increase in differential temperature in the first temperature sensor over time.

8. The method of claim 1, further comprising:
sensing a pressure in the packing case; and
determining, at least in part from at least one sensed pressure, the degradation indicator for the at least one of the seals of the packing case.

9. The method of claim 8, wherein the pressure is sensed on a cylinder-side of at least one of the first temperature sensor or the second temperature sensor.

10. The method of claim 8, wherein the pressure is sensed on a driver-side of at least one of the first temperature sensor or the second temperature sensor.

11. The method of claim 8, wherein the pressure is sensed in a lube line of the packing case.

12. The method of claim 8, wherein the pressure is sensed in a vent line of the packing case.

13. The method of claim 8, further comprising providing a notification to a user based on the degradation indicator.

14. A monitoring system for a packing case having two or more seals and defining a cylinder-side and a driver-side, the monitoring system comprising:
a first temperature sensor coupled to a housing of the packing case and configured to sense a temperature on the cylinder-side of one of the two or more seals;
a second temperature sensor coupled to the housing and configured to sense a temperature on the driver-side of the one of the two or more seals; and
a computing device communicatively coupled to the first temperature sensor and the second temperature sensor, the computing device configured to:
receive signals from the first temperature sensor and the second temperature sensor;
compute, from the signals, a temperature differential between the first temperature sensor and the second temperature sensor at two or more times; and
determine, at least in part from the temperature differential at the two or more times, a degradation indicator for the one of the two or more seals of the packing case;
wherein the two or more seals comprise:
a pressure breaker;
a first seal axially disposed on the driver-side of the pressure breaker;
a second seal axially disposed on the drive-side of the first seal; and
a third seal axially disposed on the driver-side of the second seal,
wherein the one of the two or more seals is the third seal, and the first temperature sensor is axially disposed between the second seal and the third seal.

15. The monitoring system of claim 14, wherein the second temperature sensor is axially disposed between the third seal and an end plate seal.

16. The monitoring system of 14, wherein:
the system further comprises a third temperature sensor axially disposed on the cylinder-side of the of the second seal,
the computing device is communicatively coupled to the third temperature sensor, and
the computing device is configured to compute a temperature differential between the third temperature sensor and at least one of the first temperature sensor and the second temperature sensor.

17. The monitoring system of claim 14, further comprising a pressure sensor configured to sense a pressure on the cylinder-side of the one of the two or more seals.

18. The monitoring system of claim 14, further comprising a pressure sensor coupled to a lube line of the packing case.

19. The monitoring system of claim 14, further comprising a pressure sensor configured to sense a pressure on the driver-side of the one of the two or more seals.

20. The monitoring system of claim 14, further comprising a pressure sensor coupled to a vent line of the packing case.

21. The monitoring system of claim 14, wherein the packing case monitoring system is communicatively coupled to a cylinder-side pressure sensor, wherein the packing case monitoring system is configured to determine, at least in part from information received from the cylinder-side pressure sensor, the degradation indicator.

22. The monitoring system of claim 14, wherein the packing case monitoring system is communicatively coupled to a driver-side pressure sensor, wherein the packing case monitoring system is configured to determine, at least in part from information received from the driver-side pressure sensor, the degradation indicator.

23. The monitoring system of claim 14, wherein the packing case monitoring system is configured to provide a notification of the degradation indicator to a user.

24. The monitoring system of claim 14, wherein the packing case monitoring system is configured to provide a notification to a user about degradation of the one of the two or more seals.

25. The monitoring system of claim 14, wherein the packing case monitoring system is configured to provide, based at least in part on the degradation indicator, a notification to a user about timing of a maintenance event for the one of the two or more seals of the packing case.

26. The monitoring system of claim 14, wherein the packing case monitoring system is configured to provide, based at least in part on the degradation indicator, a warning to a user about a seal failure in the packing case.

27. The monitoring system of claim 14, wherein the packing case monitoring system is configured to provide, based at least in part on the degradation indicator, a predictor to a user about the one of the two or more seals of the packing case.

28. A system comprising:
a packing case assembly, comprising:
  a plurality of seals;
  a housing configured to hold at least two seals of the plurality of seals;
  an end plate coupled to the housing;
  a first temperature sensor coupled to a housing of the packing case and configured to sense a temperature on the cylinder-side of one of the at least two seals; and
  a second temperature sensor coupled to the housing and configured to sense a temperature on the driver-side of the one of the at least two seals; and
a computing device communicatively coupled to the first temperature sensor and the second temperature sensor, the computing device configured to:
  receive signals from the first temperature sensor;
  receive signals from the second temperature sensor;
  compute, from the signals, a temperature differential between the first temperature sensor and the second temperature sensor at two or more times; and
  determine, at least in part from the temperature differential at the two or more times, a degradation indicator for the one of the at least two seals, wherein the degradation indicator is based at least in part on a maximum differential temperature between the first temperature sensor and the second temperature sensor.

29. A reciprocating compressor system comprising:
a compression cylinder defining a compression chamber;
a driver;
a rod coupled between the driver and the compression cylinder, wherein the driver is operable to reciprocate the rod such that gas is compressed in the compression chamber;
a packing case through which the rod passes between the compression cylinder and the driver, the packing case defining a cylinder-side and a driver-side, and comprising:
  a plurality of seals through which the rod passes;
  a housing configured to hold at least two seals of the plurality of seals; and
  an end plate coupled to the housing; and
a packing case monitoring system, the packing case monitoring system comprising:
  a first temperature sensor coupled to a housing of the packing case and configured to sense a temperature on the cylinder-side of one of the at least two seals;
  a second temperature sensor coupled to the housing and configured to sense a temperature on the driver-side of the one of the at least two seals; and
  a computing device communicatively coupled to the first temperature sensor and the second temperature sensor, the computing device configured to:
    receive signals from the first temperature sensor and the second temperature sensor;
    compute, from the signals, a temperature differential between the first temperature sensor and the second temperature sensor at two or more times; and
    determine, at least in part from the temperature differential at the two or more times, a degradation indicator for at least the one of the at least two seals of the packing case.

30. A method of monitoring degradation of seals of a packing case, the method comprising:
receiving temperature signals from at least two temperature sensors installed in a housing of the packing case, wherein the at least two temperature sensors comprise:
  a first temperature sensor installed in a first location in the housing; and
  a second temperature sensor installed in a second location in the housing;
receiving pressure signals from one or more pressure sensors coupled to the housing of the packing case;
computing, from the temperature signals, a temperature differential between the first temperature sensor and the second temperature sensor at two or more times;
computing, from the pressure signals, a pressure at two or more times; and
determining, based at least in part on the temperature differential at the two or more times and at least one pressure of the pressure at the two or more times, one or more degradation indicators for at least one of the seals of the packing case.

31. The method of claim 30, wherein at least one of the one or more degradation indicators is based at least in part on a maximum differential temperature between the first temperature sensor and the second temperature sensor.

32. The method of claim 30, wherein at least one of the one or more degradation indicators is determined from two or more pressures of the pressure at the two or more times.

33. The method of claim 30, wherein at least one of the one or more degradation indicators is an early-stage degradation indicator.

34. The method of claim 30, wherein at least one of the one or more degradation indicators is a mid-stage degradation indicator.

35. The method of claim 30, wherein at least one of the one or more degradation indicators is a late-stage degradation indicator.

36. The system of claim 30, wherein:
the packing case assembly further comprises a pressure sensor; and
the computing device is further configured to:
  receive pressure signals from the pressure sensor; and
  determine, at least in part from the pressure signals, the degradation indicator for the one of the at least two seals.

37. The system of claim 29, wherein the pressure sensor is coupled to a lube line of the packing case assembly.

* * * * *